United States Patent [19]

Mizrahi-Shalom et al.

[11] Patent Number: 5,619,663
[45] Date of Patent: Apr. 8, 1997

[54] COMPUTER INSTRUCTION PREFETCH SYSTEM

[75] Inventors: Ori K. Mizrahi-Shalom, San Jose, Calif.; Farrell L. Ostler, Albuquerque, N.M.; Gregory K. Goodhue, San Jose, Calif.

[73] Assignee: Philips Electronics North America Corp., New York, N.Y.

[21] Appl. No.: 308,051

[22] Filed: Sep. 16, 1994

[51] Int. Cl.⁶ .................................................. G06F 9/38
[52] U.S. Cl. .......................... 395/383; 395/452; 395/464
[58] Field of Search ................................ 395/375, 775, 395/800, 452, 464

[56] References Cited

U.S. PATENT DOCUMENTS

| | | | |
|---|---|---|---|
| 4,583,163 | 4/1986 | Kobayashi et al. | 395/250 |
| 4,847,759 | 7/1989 | Oklobdzija | 395/250 |
| 5,269,007 | 12/1993 | Hanawa et al. | 395/375 |
| 5,367,657 | 11/1994 | Khare et al. | 395/445 |
| 5,438,668 | 8/1995 | Coon et al. | 395/375 |
| 5,473,764 | 12/1995 | Chi | 395/375 |

FOREIGN PATENT DOCUMENTS

| | | | |
|---|---|---|---|
| 0293720A2 | 7/1988 | European Pat. Off. | G06F 12/08 |
| 0613087A1 | 8/1994 | European Pat. Off. | G06F 12/02 |

*Primary Examiner*—Glenn A. Auve
*Attorney, Agent, or Firm*—Debra K. Stephens

[57] ABSTRACT

An instruction prefetch system for a digital processor, and in particular a microcontroller which includes the prefetch system and instruction queue normally provided as part of the instruction fetch unit, to which is added a second instruction prefetch buffer in the system, preferably in the bus interface unit which serves as the memory interface unit. This added prefetch buffer has storage for only a small number of bytes or words, and operates to supply prefetched instructions to the queue in the instruction fetch unit. However, it operates under the following constraint: it only prefetches within the boundaries of each small block of code memory and stalls when a block boundary is reached until a new address appears. This approach combines some cache and prefetch principles for a limited cost design.

9 Claims, 3 Drawing Sheets

COMPUTER INSTRUCTION PREFETCH SYSTEM

COMPUTER INSTRUCTION PREFETCH SYSTEM

This invention relates to an instruction prefetch system for use in a computer, and in particular in a single chip microcontroller.

BACKGROUND OF THE INVENTION

Processors with a large memory address space usually employ a mechanism for accessing an external memory subsystem. For a low cost market, implementation of the external memory interface involves a balance of memory bandwidth and cost. For a low end microcontroller, package size, number of pins, and also silicon die cost are additional constraints. A high pin count is often not practical. Therefore, to increase memory bandwidth, increased memory bus utilization is important, i.e., more accesses per unit time. Two basic solutions are in common use; caching and prefetching. For those systems where caching is too expensive, prefetching is the preferred alternative.

Prefetching is normally used to fill an instruction buffer or queue in the instruction fetch unit. Program counter logic is involved in generating the address stream and requests to the memory subsystem. Memory reads automatically continue as long as there are empty locations in the queue. A problem with this approach is the address generation logic, due to address space and protection considerations. Moreover, in complex pipelined designs, where the program counter/fetch address logic is totally separated from the external memory interface logic, further problems arise to aggravate the situation.

SUMMARY OF THE INVENTION

An object of the invention is a prefetch system which is relatively inexpensive to implement yet provides increased memory throughput.

Another object of the invention is a low cost prefetch system for a low end microprocessor or microcontroller.

In accordance with the invention, the prefetch system and queue normally provided as part of the instruction fetch unit is retained but a second instruction prefetch buffer is included in the system, preferably in the bus interface unit which serves as the external memory interface unit, so that it is tightly coupled to the external memory subsystem. This added prefetch buffer has storage for only a small number of bytes or words, and operates to supply prefetched bytes of code to the queue in the instruction fetch unit. However, it operates under the following constraint: it only prefetches within the boundaries of each small block of code memory and stalls when a block boundary is reached until a new address in another block appears. This approach combines some cache and prefetch principles for a limited cost but effective design.

DETAILED DESCRIPTION OF THE PREFERRED EMBODIMENTS

The invention is generally useful in all kinds of computers but is particularly useful in microcomputers and especially single chip microcontrollers (μC) because of the limited pin count and limited on-chip memory. The invention will be described in connection with such a μC but it is to be understood that the invention is not so limited.

Figure 1:
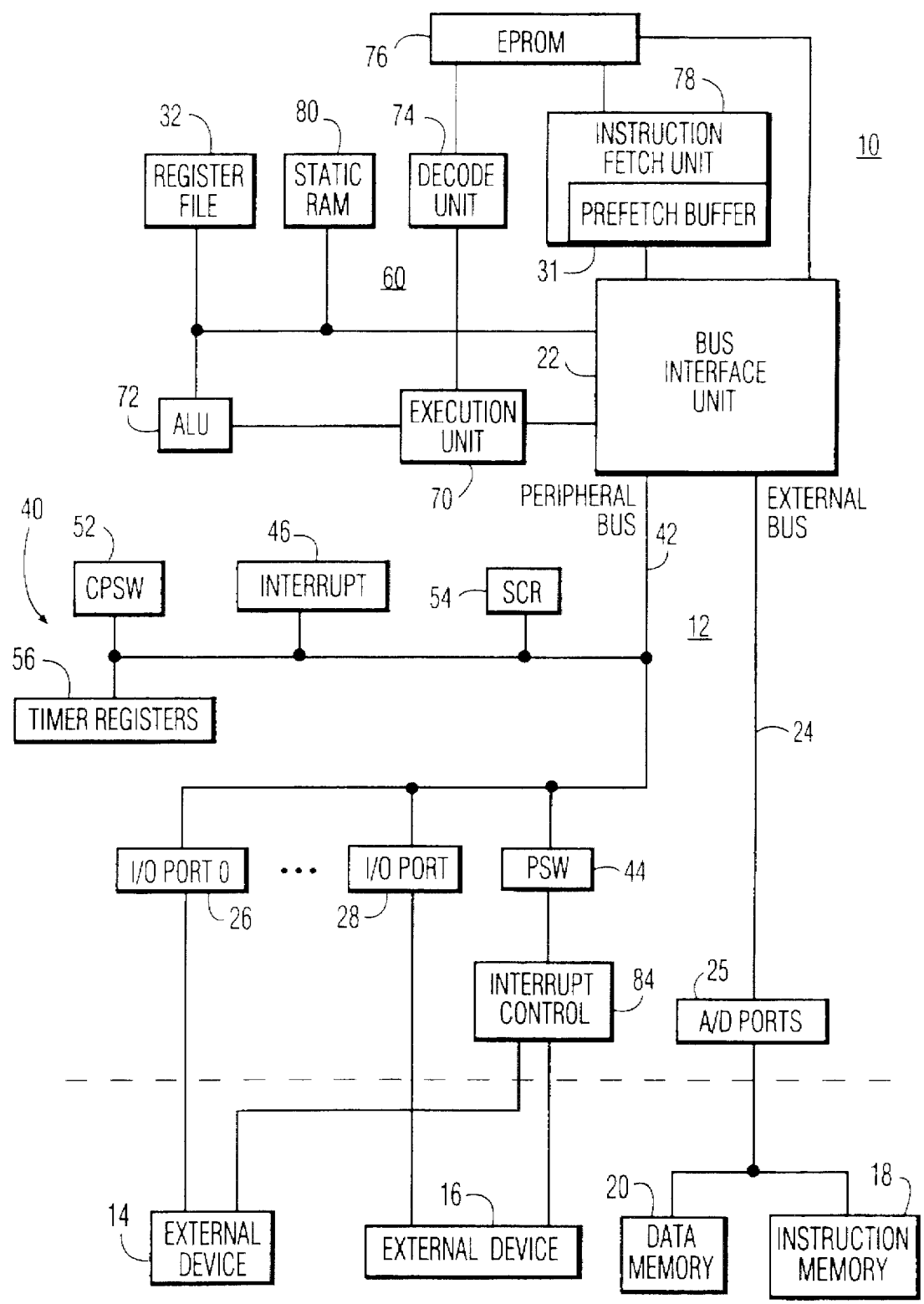
FIG. 1 is a schematic block diagram of the architecture of one form of a microcontroller in accordance with the invention.

FIG. 1 shows a schematic block diagram of a one-chip μC system 10. The system 10 includes a single chip microcontroller 12 with separate internal instruction and data storage. The microcontroller 12 supports external devices 14 and 16 and, through 20/24 bit external address capability, supports sixteen megabytes of external instruction storage 18 (also referred to as code memory from time-to-time) and sixteen megabytes of external data storage 20. The microcontroller 12 includes a bus interface unit 22 which communicates through A/D port 25 with the external memories 18 and 20 over an external bi-directional address and data bus 24. The microcontroller 12 communicates with the external devices 14 and 16 through I/O ports 26–28 which are addressable as special function registers (SFR) 40. The ports 26–28 as well as other special function registers are addressable over an internal peripheral bus 42 through the bus interface unit 22. The on-chip special function registers 40 also include a program status word (PSW) register 44 coupled to an interrupt control unit 84 communicating with internal and external devices, an interrupt register 44, timer registers 50, a compatibility PSW register 52 used during operations where the microcontroller 12 is emulating other microcontrollers, a system configuration register (SCR) 54 containing system configuration bits, and others (not shown) not necessary to an understanding of the present invention. The bus interface unit 22 isolates the peripheral special function registers 40 from the microcontroller core 60. The core 60 includes a microcoded execution unit 70 which controls execution of instructions by means of an ALU 72 and the other units. The instructions decoded by a decode unit 74 are fetched from an internal EPROM memory 76 or from the external instruction memory 18 by an instruction fetch unit 78, which consists of the usual program counter which contains the address of the next instruction to be executed and the usual queue for storing prefetched instuctions. Static RAM 80 as well as general purpose registers of a register file 82 are available for data storage. The dashed line 11 separates the on-chip units (above the line 11) from the devices external to the chip.

The SCR register, among other things, serves to control operating modes of the system 10. One such mode is page zero mode. When a bit in this register is set, which usually is programmable and is intended to be programmed once after reset and left alone thereafter, the set bit acts as a flag that forces generation of, say, only 16-bit data and program memory addresses for small memory configuration applications. This mode is also usable when the on-chip memory, say 1K addressable by 16 bits, is adequate for the application, in which case, no external memory will be addressed during execution of the program. While the invention may be applicable in some implementations to fetching instructions from on-chip code memory, usually, due to the small on-chip memory size and its tight coupling to the on-chip fetch unit, the same kind of problems are not encountered as when fetching from external code memory, and thus the invention is of principal use in connection with the latter.

Memory in the system 10 is addressed in units of bytes, each byte consisting of 8-bits. A word is a 16-bit value, consisting of two contiguous bytes. The storage order for data in the microcontroller 12 is "Little Endian" such that the lower byte of a word is stored at the lower address and the higher byte is stored at the next higher address. Word values are stored in various memories, registers, and word addressable SFRs with the least significant byte at the even address (the address that is specific in the code or in the pointer register) and the most significant byte at the next consecutive odd address (one greater than the address of the LSB). It is not allowed in this microcontroller 12 architecture to place a word in memory such that its LSB is at an odd address. All 16-bit word addressable locations could be accessed as both bytes and words. It is therefore possible, for example, to increment only the low-order half, or to modify only the high-order byte of a word in data memory, by making appropriate references to their memory-mapped addresses. If a word access is made from an odd address, the access will always be from an even-boundary location which is 1 less than the specified odd address, ignoring the lowest address bit 0. The external bus 24 can be configured in 8 or 16-bit mode, selected during chip reset. Depending on the mode of operation selected, all 16-bit external data accesses could be strictly words (16-bit mode) or bytes from consecutive memory locations (8-bit mode). An external word fetch in 8-bit mode results in 2 separate byte accesses (the result is the same in a single word access if the data is on-chip). The microcontroller 12 performs all arithmetic internally as either an 8 or 16-bit calculation depending on the type of instruction. A byte or word operation is determined by the data size field (DS) in the instruction opcode in most cases.

Unlike many μCs of this type, program memory target addresses referenced by jumps, calls, branches, traps and interrupt handlers, under microcode program control, are word aligned. A branch instruction may occur at any code address, but it may only branch to an even address. Branch address alignment provides two benefits: 1) branch ranges are doubled without providing an extra bit in the instruction, and 2) branched-to code executes faster if it is word aligned because the first two bytes of the instruction can be fetched simultaneously from a word-oriented code memory.

To speed up processing, the fetch unit 78 includes the usual prefetch buffer or queue which functions as part of a read-ahead scheme to fetch and store instructions sequentially following the one soon to be executed, on the assumption that most addressing of instructions is carried out sequentially and so, in a simplified pipelining approach, cycles can be saved by this prefetch scheme. However, limited chip real estate, especially for a low-cost μC, places serious constraints on the circuitry available to implement the known read-ahead schemes. The system of the invention provides a read-ahead scheme that proves to be extremely efficient in making available a succession of instructions likely to be processed at the expense of only a modest increase in circuitry to implement the new system.

Figure 2:
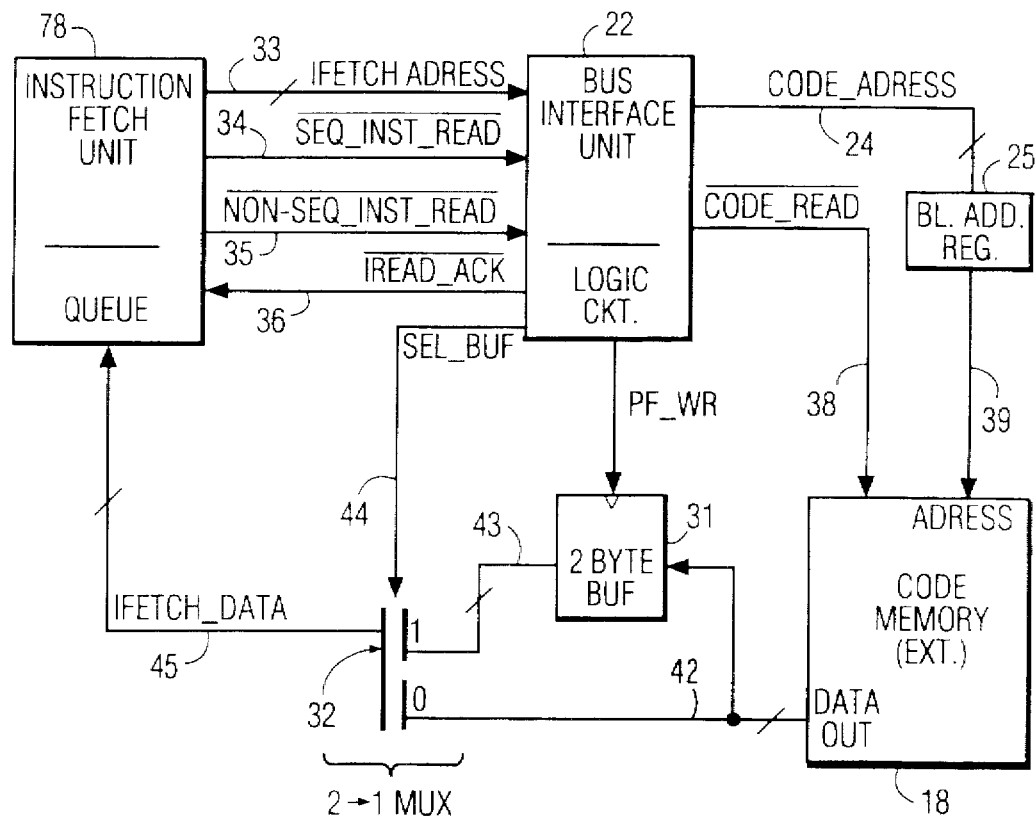
FIG. 2 is a block diagram of the prefetch system used in the microcontroller of FIG. 1.

FIG. 2 shows one form of system in accordance with the invention for providing instruction prefetch featuring simplified address generation and requiring no address comparator circuitry. The system comprises the instruction fetch unit 78, the bus interface unit 22, the external code memory 18, shown in FIG. 1, and a prefetch buffer 31, a multiplexer (MUX) 32, and a series of connections between those units. These connections include: an instruction fetch address bus (IFETCH ADDRESS) 33, two control signal inputs (SEQ-INST-READ/and NON-SEQ-INST-READ/) 34, 35 (the slash suffix indicates active-low, the same as the bar over the label) to the bus interface unit from the instruction fetch unit; one control signal (IREAD ACK/) 36 from the bus interface unit to the instruction fetch unit; a control signal (CODE READ/) 38 from the bus interface unit to the code memory as well as a code address (CODE ADDRESS/) bus 24, 39 to the code memory 18; a data output bus 42 from the code memory to both the MUX 32 input 0 and prefetch buffer 31; a data bus 43 from the prefetch buffer to input 1 of the MUX; a MUX control input 44 (SEL BUF) from the prefetch buffer; and a data output bus 45 from the MUX to the instruction fetch unit. Also shown is an external register 25 for sampling the block address part of the code address bus 24.

What is not described as it is conventional and is not important to an understanding of the invention is that such instruction fetch units usually have a queue for storing instructions to be executed to which the next prefetched instruction is added, or an instruction fetched directly from code memory when the lead instruction in the queue is fed to the decode unit 74 for execution. Nor is there shown the conventional means for flushing the queue when a branch occurs or other circumstance arises (such as an interrupt) requiring that the execution unit execute a code routine or block that is not in sequence.

Figure 3:
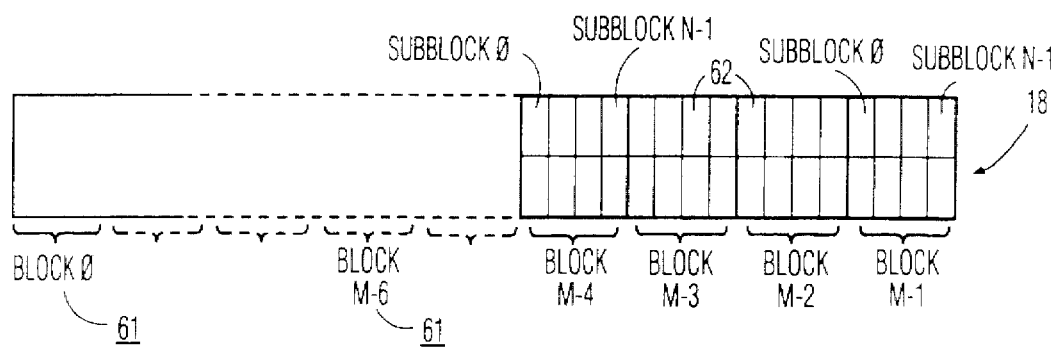
FIG. 3 is a schematic view of code memory as used in the microcontroller of FIG. 1.

FIG. 3 shows the memory organization of the code memory 18. The memory is divided into a plurality of M blocks 61, each of which consists of N subblocks 62. For, say, a 64K memory, it could, for example, be divided up into M=4096 blocks each having N=16 byte-sized or word-sized subblocks for storing, respectively, 8-bit (1 byte) or 16-bit (1 word) instructions. Thus, the buses described above would be appropriately configured to handle in parallel the number of bits simultaneously transmitted along the bus and representing a memory address or instruction data. In a preferred embodiment, each subblock constitutes 2-bytes, 1 word, and there are 8 subblocks in each block which thus comprises 16-bytes. This takes advantage of the storage alignment of data along word boundaries which allows one word to be accessed at each fetch. However, the invention is not limited to this arrangement and can be applied to other systems using different block and subblock sizes, provided that a subblock can be accessed easily in the particular memory and memory interface implemetation.

In accordance with the invention, the prefetch buffer 31 is only sized to receive up to K subblocks, where K is less than N. In the preferred embodiment, the prefetch buffer can hold only 2 bytes so that K=1. A prefetch, in this example, is of 1 subblock (equals 2 bytes) at the most.

Figure 4:
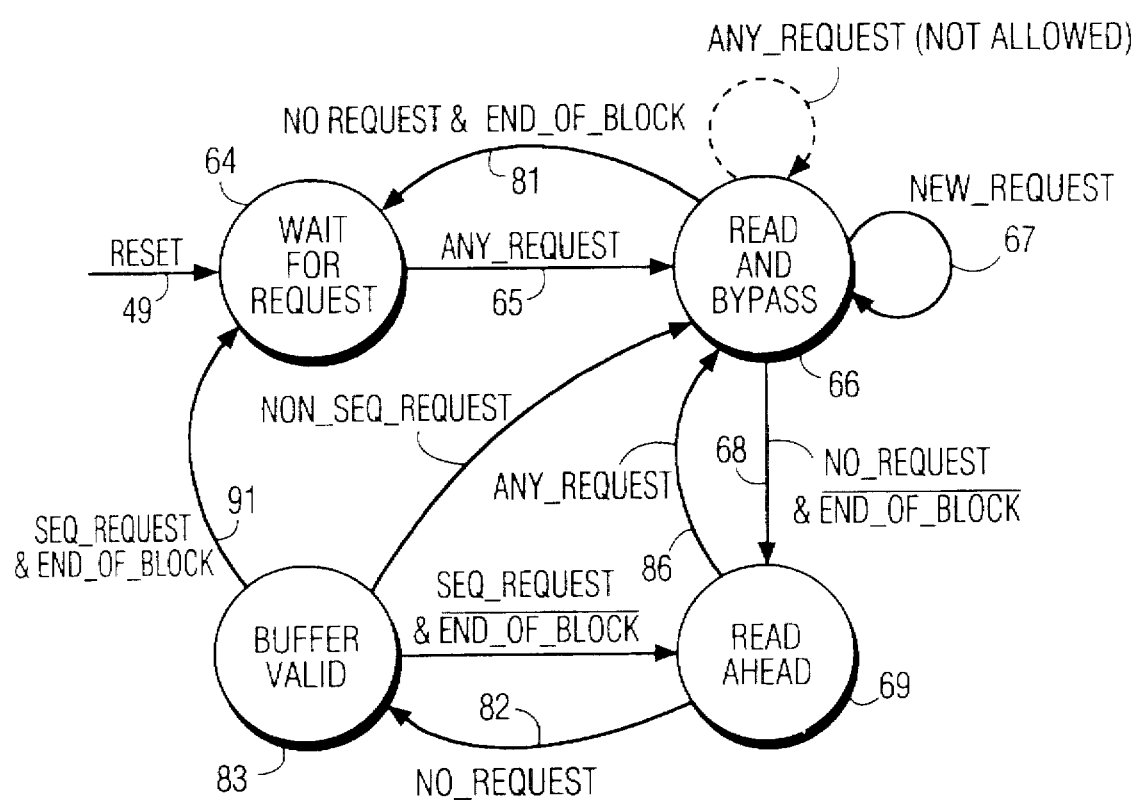
FIG. 4 is a state diagram for explaining operation of the prefetch system of the invention.

The operation of the system will be best understood in connection with the state diagram shown in FIG. 4, where states are represented in the normal way by circles and transitions by the arcs between circles or to the same circle, and by an algorithm for explaining the means for implementing the invention in connection with the state diagram of FIG. 4, using the following definitions:

CAB means code address buffer 25 (FIG. 2) for holding the address for a block. This is conventional and is normally implemented on the system board, wherein the address is latched by a control signal "ALE" (address latch enable).

PFB means the prefetch buffer 31.

IBA means the in-block address in the register 25, the lower address bits to address the smallest addressable quantity in the code memory space.

ACK means sending an acknowledge signal in response to an instruction read request.

REQUEST means the generation of an instruction read request by the instruction fetch unit.

SEQ means sequential.

any request means a sequential or non-sequential read request.

READ AND BYPASS means that an instruction is fetched from code memory but goes directly to the instruction fetch unit, bypassing the prefetch buffer 31, via MUX 32.

READ AHEAD means that an instruction is fetched from code memory and is stored in the prefetch buffer.

The algorithm, below, spells out the principal events that occur during fetch cycles. Other events which may occur, such as handling simultaneous events, are not described as not essential to an understanding of the invention.

IF (RESET) 49 then invalidate the PFB and "WAIT FOR REQUEST" 64;

IF (WAIT FOR REQUEST-64) then

IF any request 65 then start "READ AND BYPASS" 66 to instruction fetch unit;

IF (READ AND BYPASS-66) then

IF cycle completed then ACK the instruction fetch unit and then

IF new request 67 then continue "READ AND BYPASS"

ELSE if no request and not end of block 68 then "READ AHEAD" 69

ELSE if no request and end of block 81 then "WAIT FOR REQUEST" 64;

IF (READ AHEAD-69) then increment address to next subblock and then

IF cycle completed and no request 82 then store data in PFB and "buffer valid" 83

ELSE IF cycle not completed and seq request 86 then continue cycle as "READ AND BYPASS" 66

ELSE IF cycle not completed and non seq request (not shown) then abort cycle and start a new "READ AND BYPASS";

IF (BUFFER VALID) then

IF seq request then pass data from buffer and ACK the instruction fetch unit and then IF end of block 91 then "WAIT FOR REQUEST" 64

ELSE continue next "READ AHEAD" (not shown)

IF non seq request 92 then invalidate buffer and then start a new cycle of "READ AND BYPASS".

The transition 86 from READ AHEAD to READ AND BYPASS covers the situation when a request arrives in the middle of the read-ahead cycle, and is dealt with as a current request and never buffered. The transition 92 from BUFFER VALID covers the situation when the buffer 31 contains the next sequential subblock but a non-sequential request arrives, in which case the buffer is invalidated and the new request is serviced as a current request, bypassing the buffer. The transition 91 from BUFFER VALID covers the situation when the buffer 31 is valid and on a sequential request, data from the buffer is sent to the instruction fetch unit 78, but the read-ahead stalls since the end of the block was reached.

The system starts on reset 49 of the μC, which loads the address of the first routine to execute into the program counter. The system will automatically proceed to perform prefetches on each machine cycle as the instructions are fed to the queue and the latter empties during execution. The prefetches continue until the end of the block in which the first prefetch was made. So, for example, if the first prefetch address in block 0 was subblock N–3, assuming no interrupts or branches, the next two subblocks (N–2, N–1) would be fetched, and since the block boundary is reached—meaning that the next sequential address is of a subblock in the next block 1—, the prefetch operation stops. While the prefetches are coming from the same block, the MUX 32 is controlled by active SEL BUF, to pass on to the instruction fetch unit the stored subblock in the prefetch buffer 31. On the other hand, when the fetch request to code memory is of a non-sequential address, or of a address in a new block, then SEL BUF remains inactive and the MUX 32 passes the fetched instruction directly from code memory 18. The handshake signal IREAD-ACK/ is used to signal the instruction fetch unit that a fetched bytes of code are valid and can be stored in the instruction queue. The logic circuitry to achieve this mode of operation is straightforward and will be evident from the description and state diagram given to any person of average skill in this art.

The fetch address is derived from the instruction fetch unit, and is latched at the bus interface unit 22 and/or an external latch (by means of the ALE signal) as part of its normal operation. Latching of an address is what allows a code memory read operation to take place. This latching of a new address occurs only when the program counter is loaded with a new non-sequential address, instead of being incremented, or when incrementing the address in the bus interface unit will cause it to cross the alignment of a block boundary (into a new block). Once the address is latched and the instruction at that address is fetched, then subsequent fetches are made by simply incrementing that address until the block boundary is reached. Then the bus interface unit stalls and waits for the next fetch address from the instruction fetch unit. This logic takes advantage of the SEQ INST READ/ and NON SEQ INST READ/ control signals supplied by the instruction fetch unit to the bus interface unit. Then, on the next machine cycle, the non-sequential instruction at the new latched address can be fetched and passed directly on to the instruction fetch unit. Since the increment logic works and prefetching continues up to the 16 byte boundary for the example given—when it stalls until a new address is latched—, it simplifies the increment logic capability of the prefetch logic, since it need handle only a small number of address bits, 4 in the example given for at most 15 increments, and avoids dealing with possible overflows on the page or segment address, which would require special handling in this implementation, as well as in other schemes, such as protected memory management. However, even with this relatively small capability, an average of over 8 bytes prefetch per 16 bytes of code allows some parallelism and increases the usable memory throughput compared to a similar system without the invention at only a modest increase in circuitry, die real estate, and cost. Another way to perceive the invention is in the extent of coupling of the prefetch buffer units to the instruction fetch unit. The instruction queue can be considered as loosely coupled to the memory subsystem, while it is capable of continuously generating look ahead addresses for every address placed in the program counter throughout the entire code address space. In contrast, the added prefetch buffer 31 and associated units and logic added by the present invention are tightly coupled to the memory subsystem, while having limited address generation, since the added prefetch buffer 31 operates only in response to a new block address being latched and then automatically only while the next limited sequence of addresses does not cross a block boundary.

The simplicity of this approach enables to reduce the size of the storage requirements for prefetch at the bus interface unit, and reduces also the associated logic.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A computer system comprising:
   (a) a code memory divided into a plurality of M blocks each block containing a plurality of N addressable subblocks accessible via a first range of sequential addresses, said memory storing instructions in said plurality of blocks and subblocks,
   (b) an instruction fetch unit for generating addresses for fetching instructions from said code memory one instruction word at a time, said instruction fetch unit being capable of generating addresses for substantially all addressable locations of all blocks of the plurality of blocks,
   (c) a prefetch buffer for storing only K subblocks representing code which is full or partial instructions, said number K being less than N,
   (d) said instruction fetch unit having first means for storing the address of an instruction to be executed,
   (e) second means, in response to said first means being loaded with the address of one subblock in one of said blocks, and prior to a non-sequential program flow change, for causing said prefetch buffer to fetch from the code memory and store in the prefetch buffer the instruction stored at the next subblock sequentially following the said one subblock in said one block until a subblock located in the next sequential block is reached, and
   (f) third means for preventing the prefetch buffer from prefetching from the code memory a code stored at a subblock in another block that is different from said one block until said first means is first loaded with the address of a subblock in said another block.

2. The computer system of claim 1, wherein N=8 and K=1.

3. The computer system of claim 1, wherein said second means comprises a bus interface unit having first and second inputs connected to the instruction fetch unit to receive, respectively, the address of an instruction to fetch and a control signal to read the instruction stored in code memory, a first output connected to the code memory to supply the address to be read, a second output furnishing a control signal to read the instruction at the address to be read, and third output to provide an instruction-valid control signal to the instruction fetch unit indicating whether a fetched instruction is valid.

4. The computer system of claim 3, wherein said bus interface unit further comprises a fourth output providing a control signal to the prefetch buffer to store an instruction received form the code memory.

5. The computer system of claim 3, further comprising a multiplexer having an output connected to the instruction fetch unit, and having a first data input connected to receive instructions from the code memory, a second data input connected to receive subblocks from the prefetch buffer, and a control input connected to receive a control signal from the bus interface unit determining which of the first and second inputs is connected to the output.

6. The computer system of claim 1, wherein the computer is a microcontroller.

7. A method of prefetching instructions from a code memory in a computer, comprising:
   (a) providing code memory for storing instructions and subdividing it into a plurality of M blocks, each block containing a plurality of N addressable subblocks accessible via a first range of sequential addresses;
   (b) providing a prefetch buffer having storage for K subblocks where K<N;
   (c) generating in an instruction fetch unit, an address in one of the blocks for fetching the instruction stored at the address;
   (d) prefetching from the code memory and storing in the prefetch buffer, instruction bytes stored at the next subblock sequentially following one subblock in said one block and continuing to prefetch until a subblock located in the next block is reached and then stopping; and
   (e) starting and continuing the prefetching step (d) only after a new sequential address in a new block or a non-sequential address in any block of the plurality of blocks is generated in the new block or said any block, respectively.

8. The method of claim 7, further comprising:
   providing a multiplexer connected between the code memory and the instruction fetch unit and between the prefetch buffer and the instruction fetch unit; and
   controlling said multiplexer to supply to the instruction fetch unit, instructions fetched from the code memory when the new sequential address is generated and to supply to the instruction fetch unit, instruction bytes fetched from the prefetch buffer in all other cases.

9. The method of claim 7, wherein N=8, and K=1.

* * * * *